United States Patent [19]

Mullen

[11] 4,319,602
[45] Mar. 16, 1982

[54] VACUUM CHECK BOWL

[75] Inventor: Richard J. Mullen, Grand Island, Nebr.

[73] Assignee: Chief Industries, Inc., Grand Island, Nebr.

[21] Appl. No.: 149,267

[22] Filed: May 12, 1980

[51] Int. Cl.³ ............................................. F16K 31/22
[52] U.S. Cl. .................................... 137/202; 137/205; 137/426; 137/433
[58] Field of Search ................ 137/205, 202, 426, 433

[56] References Cited

U.S. PATENT DOCUMENTS

| | | | |
|---|---|---|---|
| 3,727,629 | 4/1973 | Gifford | 137/205 |
| 3,827,452 | 8/1974 | Baungarten | 137/205 |
| 3,985,836 | 10/1976 | Fischer | 137/426 X |
| 4,057,364 | 11/1977 | Bratschitsch | 137/205 X |

FOREIGN PATENT DOCUMENTS

| | | | |
|---|---|---|---|
| 2819494 | 11/1978 | Fed. Rep. of Germany | 137/205 |
| 1440529 | 6/1976 | United Kingdom | 137/202 |
| 1539301 | 1/1979 | United Kingdom | 137/202 |

Primary Examiner—Alan Cohan
Attorney, Agent, or Firm—Head & Johnson

[57] ABSTRACT

A vacuum check bowl for preventing fluids from being ingested into a vacuum source which is comprised of a housing having an upper and a lower portion. The upper portion has an inlet opening and an outlet opening passing therethrough with the outlet opening in communication with the vacuum source. A conduit means, which is in communication with the outlet opening, is vertically disposed within the housing and a float means is contained within the housing and rests within the lower portion of the housing below the lower end of the conduit. The float is adapted to come into contact and seal off the conduit in the event fluid is introduced into the housing through the inlet opening.

2 Claims, 5 Drawing Figures

VACUUM CHECK BOWL

BACKGROUND OF THE INVENTION

1. Field of the Invention

The present invention relates to a vacuum check bowl and, more particularly, to such a bowl which is designed to prevent the ingestion of fluid into a vacuum source.

2. Description of the Prior Art

Various systems have been designed to prevent the ingestion of fluid into a vacuum source where the vacuum source is used to evacuate different types of fluid from containers. The majority of these types of devices have electrical contacts within a sump area such that if fluid is introduced into the sump area the contacts are closed and the vacuum source is deactivated. These devices are generally located within or very close to the vacuum source and require an electrical current. Other vacuum check bowl devices have utilized a float mechanism wherein the float is attached to a valve and when fluid enters the bowl the valve is closed by the lifting or raising of the float. These devices are generally expensive to manufacture due to the float and valve mechanism and require a relatively large space. Further, it appears that there are no vacuum check bowl devices which offer positive vacuum shut off without any electrical or mechanical movements and is adapted to be placed within a vacuum system away from the vacuum source.

SUMMARY OF THE INVENTION

The present invention generally provides a vacuum check bowl which offers a positive vacuum shut off with no electrical or mechanical moving parts. The check bowl device requires a small space and may be placed within a vacuum evacuating system away from the vacuum source. Further, the present invention is easy to manufacture, is lightweight, jam and foul-proof, and offers the capability of visual inspection of the interior of the check bowl.

The present invention, more particularly, comprises a housing, which may generally be of a cylindrical shape, which has an upper and a lower portion. The upper portion of the housing has an inlet opening and an outlet opening, with the outlet opening being in communication with a vacuum source. A conduit, which is in communication with the outlet opening, is vertically disposed within the housing and is generally centrally disposed within the housing. A float means which is contained within the housing and which rests within the lower portion of the housing below the conduit is adapted to come into contact and seal off the vacuum flow through the conduit in the event that fluid is introduced into the housing through the inlet opening. For example, the float means may be a cylindrical floating object, such as a ball, which will rise with the ingested fluid and come into sealing contact with a rubber cup, which is attached to the lower end of the conduit, thereby completely sealing the vacuum flow preventing the possible ingestion of the fluid into the vacuum source. The present invention is particularly adapted for vacuum systems which are designed to evacuate fluid from an industrial tire, such as a farm tractor tire, wherein the fluid is drawn by means of a vacuum from the tire into a holding tank and in the event that the tank should overflow the check bowl device will prevent this overflow of fluid, which may be of a type which would be very damaging to the vacuum source, from being ingested into the vacuum source.

DETAILED DESCRIPTION OF THE PREFERRED EMBODIMENTS

Figure 1:
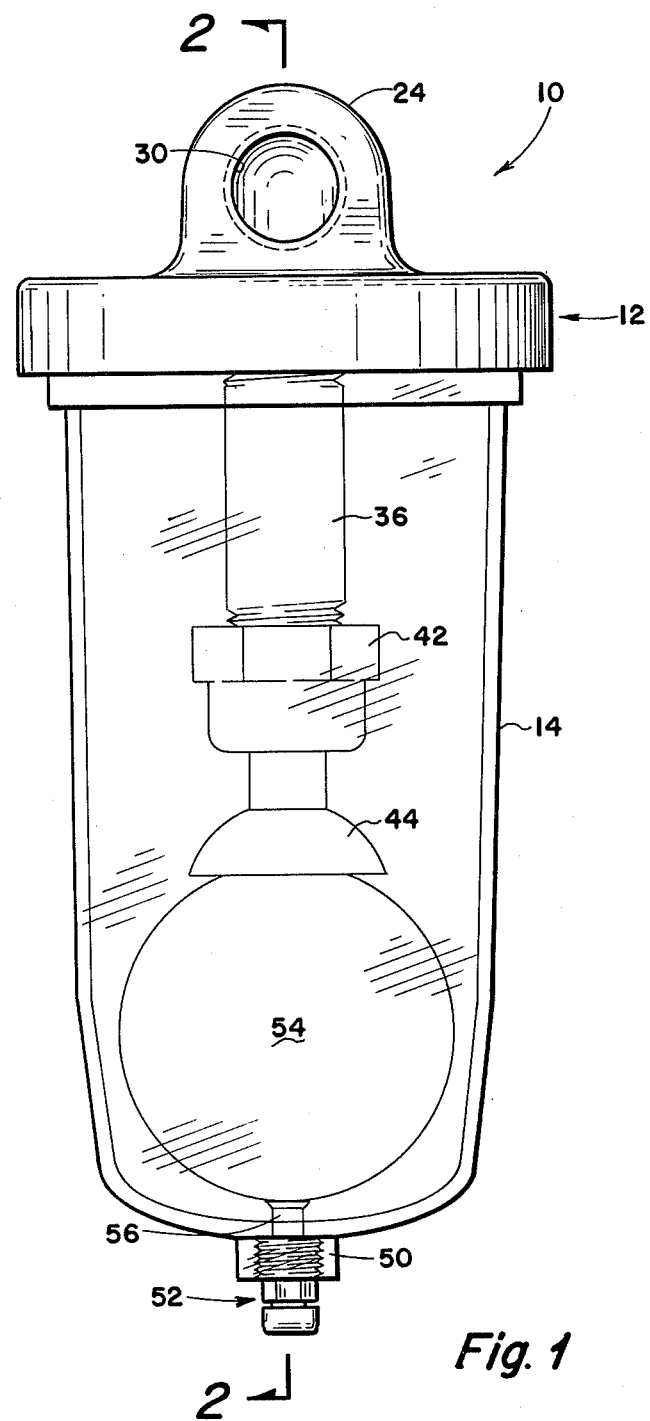
FIG. 1 is a side elevational view of a vacuum check bowl device embodying the present invention.
Figure 2:
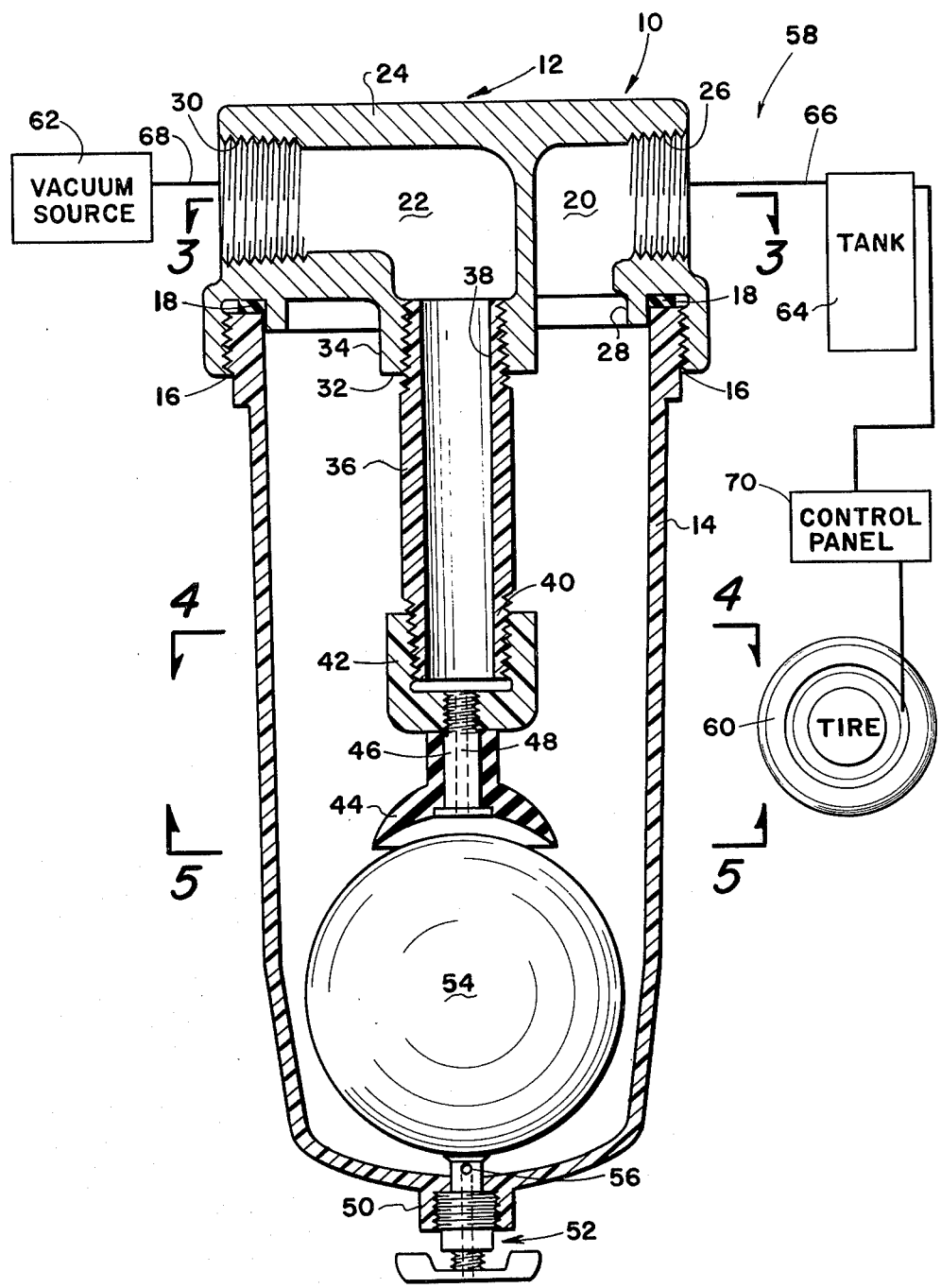
FIG. 2 is a view of the device taken along line 2—2 of FIG. 1.
Figure 3:
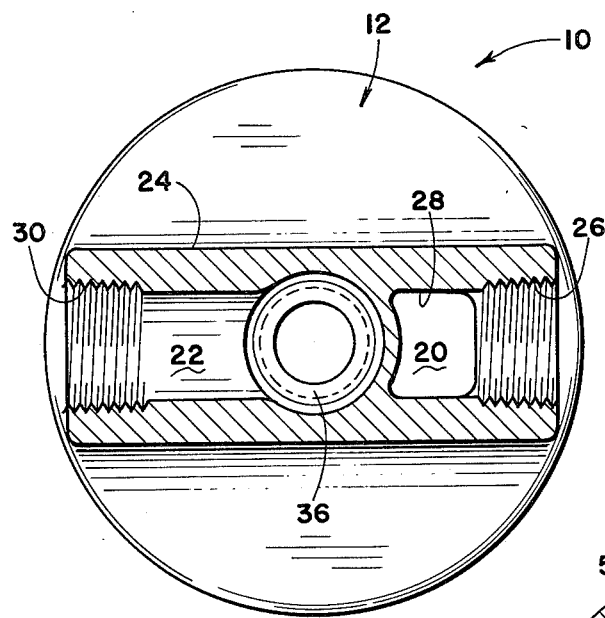
FIG. 3 is a view of the device taken along line 3—3 of FIG. 2.
Figure 4:
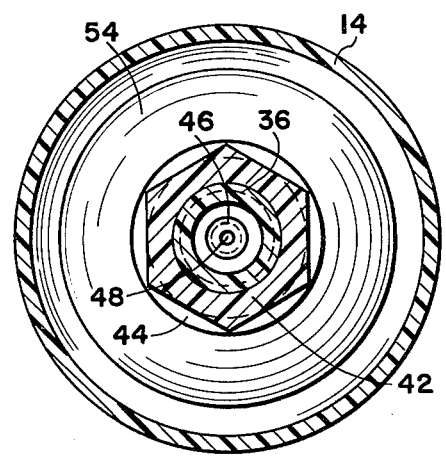
FIG. 4 is a view of the device taken along line 4—4 of FIG. 2.
Figure 5:
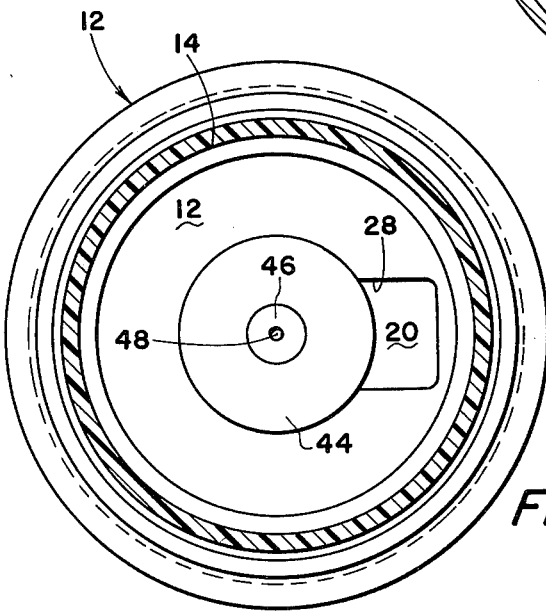
FIG. 5 is a view of the device taken along line 5—5 of FIG. 2.

Referring to the drawings in detail, reference character 10 generally indicates a vacuum check bowl device particularly designed to positively shut off a vacuum source in the event that liquid is ingested into the system. As shown in FIG. 1, the vacuum check bowl device 10 is comprised of an upper member 12 and a lower elongated housing 14 or may be constructed as one unit. The device 10 may be constructed almost entirely from plastic material for ease of manufacturing and low cost but may also be manufactured from any other suitable materials. The lower housing 14 is preferably constructed of a clear, inert plastic material so as to allow visual inspection of the interior workings of the device 10. As shown in FIG. 2, the upper member 12 and the lower housing 14 are provided with cooperable threaded lips 16 so that the upper member 12 may be screwed onto the housing 14. This feature allows the housing 14 to be removed for periodic cleaning. An O-ring gasket 18 rests upon the upper portion of the housing 14 and provides an air and fluid seal when the upper member 12 is threaded onto the housing 14. As shown in FIGS. 2 and 3, the upper member 12 is provided with an inlet chamber 20 and a separate outlet chamber 22 within a raised or domed central section 24 of the upper member 12. The domed section 24 is provided with a horizontal threaded opening 26 into the inlet chamber 20, and the upper member 12 is provided with a lower opening 28, which allows for communication between the inlet chamber 20 and the interior of the housing 14. The domed section 24 is provided with a horizontal threaded opening 30 into the outlet chamber 22 and the upper member 12 is provided with a threaded lower opening 32 through an extension 34, which extends into the interior of the housing 14. The extension 34 is configured such that the opening 32 opens into the center of the housing 14. A conduit 36 with a threaded upper end 38 is threaded into the opening 32 and extends centrally and vertically downward into the interior of the housing 14. The conduit 36 is provided with a lower threaded end 40 which has a nut or cap 42 threaded thereon as shown in FIGS. 2, 4 and 5. A deformable and semi-spherical cup 44, such as a rubber suction cup, having a metal central shaft 46, is threaded into the cap 42. The shaft 46 is provided with a bore 48 which extends therethrough and which allows communication between the interior of the conduit 36 and the interior of the housing 14 for the vacuum flow.

The lower central portion of the exterior of the housing 14 is provided with an upset 50 which has a drain cock 52 threaded thereinto. The drain cock 52 extends into the interior of the housing 14 to provide a drainage means to evacuate any liquid which possible may be ingested from the interior of the housing 14.

A float means 54, which may be a plastic or rubber ball or any other suitable floating object, is contained within the interior of the housing 14 beneath the cup 44. The ball 54 rests upon a flattened end of a shaft 56 which extends into the interior of the housing 14. The shaft 56 is the central drain member of the drain cock 52 which extends into the housing 14. The ball 54 is of the cross-sectional area of the lower housing 14 so that the ball 54 will be maintained in alignment with the cup 44. As can be seen, the distance between the upper portion of the ball 54 and the cup 44 may be varied by rotating the nut 42 on the conduit 36. Generally, the preferred distance between the cup 44 and the ball 54 is approximately ¾ to 1″. This distance is great enough to prevent the ball 54 from being sucked or drawn into contact with the cup 44 merely by the vacuum flow and is also close enough to shut off the flow of vacuum quickly upon the ingestion of a small amount of liquid.

Vacuum check bowl device 10 is adapted to be used in a fluid evacuation system which operates from a vacuum source. For example, in FIG. 2 the device 10 may be used within a tire servicing machine 58 of the type which evacuates liquid material from a large industrial or farm tractor tire 60 by means of a vacuum. The device 10 would be connected between a vacuum source 62 and a holding tank 64 by hoses 66 and 68 threaded into the openings 26 and 30 respectively, which in turn is connected to the tire 60 such that when the liquid from the tire 60, which is normally a calcium product (which would be highly damaging to the vacuum source 62 if ingested) flows from the tire 60 into the holding tank 64 by means of the vacuum drawn from the vacuum source 62 through the outlet chamber 22, the conduit 36, the bore 48 and the cup 44, and through the inlet chamber 20 and which is regulated by a control panel 70. In the event that the tank 64 overflows, the liquid would enter the inlet chamber 20 and begin to fill the interior of the housing 14 thereby causing the ball 54 to float upwards and come into sealing contact with the cup 44. As can be seen, when the ball 54 is pressed against the cup 44 the vacuum path would be sealed thereby preventing the further evacuation of liquid from the tire 60 or from the tank 64. The vacuum source 62 and control panel 70 would then sense this blockage and either would automatically shut down or would indicate this condition to the operator.

Whereas the present invention has been described in particular relation to the drawings attached hereto, it should be understood that other and further modifications of the invention, apart from those shown or suggested herein, may be made within the scope and spirit of this invention.

What is claimed is:

1. A vacuum check bowl for preventing liquid from being injested into a vacuum source comprising:

a housing having a upper portion and a lower elongated vertically situated removable bowl portion, said upper portion having an inlet opening and an outlet opening through said upper portion, said outlet opening in communication with said vacuum source;

a conduit means in communication with said outlet opening vertically disposed downwardly within said lower bowl portion, with the lower end of said conduit means terminating substantially above the bottom of said lower bowl portion;

a rubber cup attached to the bottom of said conduit means, said rubber cup having a central bore therethrough for fluid communication from the interior of the lower bowl portion to said conduit and having a concave resilient seating surface facing the bottom of said lower bowl portion;

a spherical, floatable, and freely rotatable valve positioned below said rubber cup and of diameter substantially less than the diameter of said lower bowl portion but larger in diameter than the diameter of said rubber cup, the curvature of said spherical valve being substantially equal to the curvature of said concave seating surface of said rubber cup.

2. A vacuum check bowl as in claim 1 wherein a drain cock is provided in the lower portion of said housing, said drain cock, when closed extending slightly into said lower bowl portion for said spherical valve to rest thereon.

* * * * *